(12) United States Patent
Nadiadi et al.

(10) Patent No.: US 11,192,760 B1
(45) Date of Patent: Dec. 7, 2021

(54) LOCKING SIDE PULL HOIST RING ASSEMBLY

(71) Applicant: National Technology & Engineering Solutions of Sandia, LLC, Albuquerque, NM (US)

(72) Inventors: Irfan Nadiadi, Richmond, CA (US); John Monson, Livermore, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 16/929,852

(22) Filed: Jul. 15, 2020

(51) Int. Cl.
  *B66C 1/66* (2006.01)
  *F16B 45/00* (2006.01)

(52) U.S. Cl.
  CPC ............... *B66C 1/66* (2013.01); *F16B 45/00* (2013.01); *F16B 2200/506* (2018.08)

(58) Field of Classification Search
  CPC ............. B66C 1/66; F16B 45/00; F16G 15/08
  USPC ..... 294/215, 81.51, 89; 403/78, 79; 411/400
  See application file for complete search history.

(56) References Cited

U.S. PATENT DOCUMENTS

| | | | |
|---|---|---|---|
| D258,115 S * | 2/1981 | Piatek | 248/317 |
| 6,032,993 A | 3/2000 | Kwon | |
| 6,039,500 A * | 3/2000 | Kwon | B66C 1/66 |
| | | | 294/215 |
| 6,068,310 A | 5/2000 | Fuller et al. | |
| 6,443,514 B1 | 9/2002 | Fuller et al. | |
| 6,652,012 B1 | 11/2003 | Fuller et al. | |
| 10,450,174 B1 | 10/2019 | Kucinic et al. | |
| 2006/0055188 A1 * | 3/2006 | Koch | B66C 1/108 |
| | | | 294/215 |
| 2010/0078950 A1 * | 4/2010 | Inda | B66C 1/66 |
| | | | 294/215 |
| 2011/0037279 A1 * | 2/2011 | Alba | F03D 13/10 |
| | | | 294/215 |
| 2011/0109106 A1 * | 5/2011 | Inda | F03D 13/10 |
| | | | 294/215 |
| 2013/0082477 A1 * | 4/2013 | Fuller | B66C 1/66 |
| | | | 294/215 |
| 2014/0327262 A1 * | 11/2014 | Alba | B66C 1/66 |
| | | | 294/215 |

* cited by examiner

*Primary Examiner* — Paul T Chin
(74) *Attorney, Agent, or Firm* — Medley, Behrens & Lewis, LLC (57) ABSTRACT

An assembly for rotating a workpiece including a locking side pull hoist ring removably attachable to a side surface of the workpiece. The locking side pull hoist ring comprises a load bearing structure, a rotation mechanism attached to the side surface of the workpiece that rotates about a rotation axis extending through the rotation mechanism, a locking mechanism configured to transition between a locked state and an unlocked state, and a support member connecting the load bearing structure and the rotation mechanism. The support member rotatably supports the rotation mechanism for rotation about the rotation axis and rotatably supports the load bearing structure for rotation about a second axis. In the locked state, the locking mechanism prevents rotation of the rotation mechanism by securing the rotation mechanism to the support member.

20 Claims, 5 Drawing Sheets

LOCKING SIDE PULL HOIST RING ASSEMBLY

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Conventionally, suspending a workpiece below a crane involves attaching numerous hoist rings to surfaces of the workpiece, such that ideally the workpiece is prohibited from moving (other than being hosted by the crane). However, conventional hoist rings do not allow for orientation of the workpiece to be easily defined when hoisted by a crane.

SUMMARY

The following is a brief summary of subject matter that is described in greater detail herein. This summary is not intended to be limiting as to the scope of the claims.

In an exemplary embodiment, provided is an assembly for fixing a hoisted workpiece at a desired orientation with respect to a rotation axis. The assembly includes a locking side pull hoist ring removably attachable to a side surface of the workpiece. The locking side pull hoist ring comprises a load bearing structure, a rotation mechanism attached to the side surface of the workpiece, wherein the rotation mechanism rotates about the rotation axis extending through the rotation mechanism, a locking mechanism configured to transition between a locked state and an unlocked state, and a support member connecting the load bearing structure and the rotation mechanism. In the locked state, the locking mechanism can prevent rotation of the rotation mechanism and in the unlocked state, the rotation mechanism can rotate about the rotation axis. The support member can rotatably support the rotation mechanism for rotation about the rotation axis and can rotatably support the load bearing structure for rotation about a second axis. The rotation mechanism can rotate with respect to the support member. Additionally, the locking mechanism in the locked state can secure the rotation mechanism to the support member.

A method of forming a rotatable locking side pull hoist ring includes securing a rotation mechanism in a support member. The support member can rotatably support the rotation mechanism for rotation about a rotation axis. The method further includes securing a load bearing structure in the support member. The support member can also rotatably support the load bearing structure for rotation about a second axis. The second axis and the rotation axis can be different. The method yet further includes attaching a locking mechanism between the support member and the rotation mechanism. The locking mechanism can be configured to transition between a locked state and an unlocked state. In the locked state, the locking mechanism can prevent rotation of the rotation mechanism.

Further, in accordance with various aspects, provided is an apparatus for releasably holding a workpiece at a particular orientation. The apparatus includes means for attaching to a surface of the workpiece. The apparatus may further include means for rotating the surface of the workpiece about an axis defined by the apparatus. The apparatus may yet further include means for selectively locking the surface at different orientations preventing further rotation of the surface.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to a locking side pull hoist ring assembly are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

In reference to the disclosure herein, for purposes of convenience and clarity only, directional terms, such as, top, bottom, left, right, up, down, upper, lower, over, above, below, beneath, rear, and front may be used. Such directional terms should not be construed to limit the scope of the features described herein in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the features described herein.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

Disclosed is an apparatus for suspending a workpiece via a side surface of the workpiece, rotating the workpiece about an axis defined by the apparatus, and selectively locking the workpiece at different orientations, thereby preventing further rotation of the workpiece. The disclosed apparatus includes a load bearing mechanism for hanging the apparatus, a rotation mechanism for rotating the workpiece, and a locking mechanism to secure the rotation mechanism to prevent further rotation. The disclosed apparatus can further include a support member to connect the load bearing mechanism and the rotation mechanism such that the workpiece rotates with respect to the load bearing mechanism. By locking the workpiece at desired orientations to prevent further rotation, the apparatus allows a user to select a desired orientation and then maintain that orientation without having to manually hold the workpiece.

Figure 1:
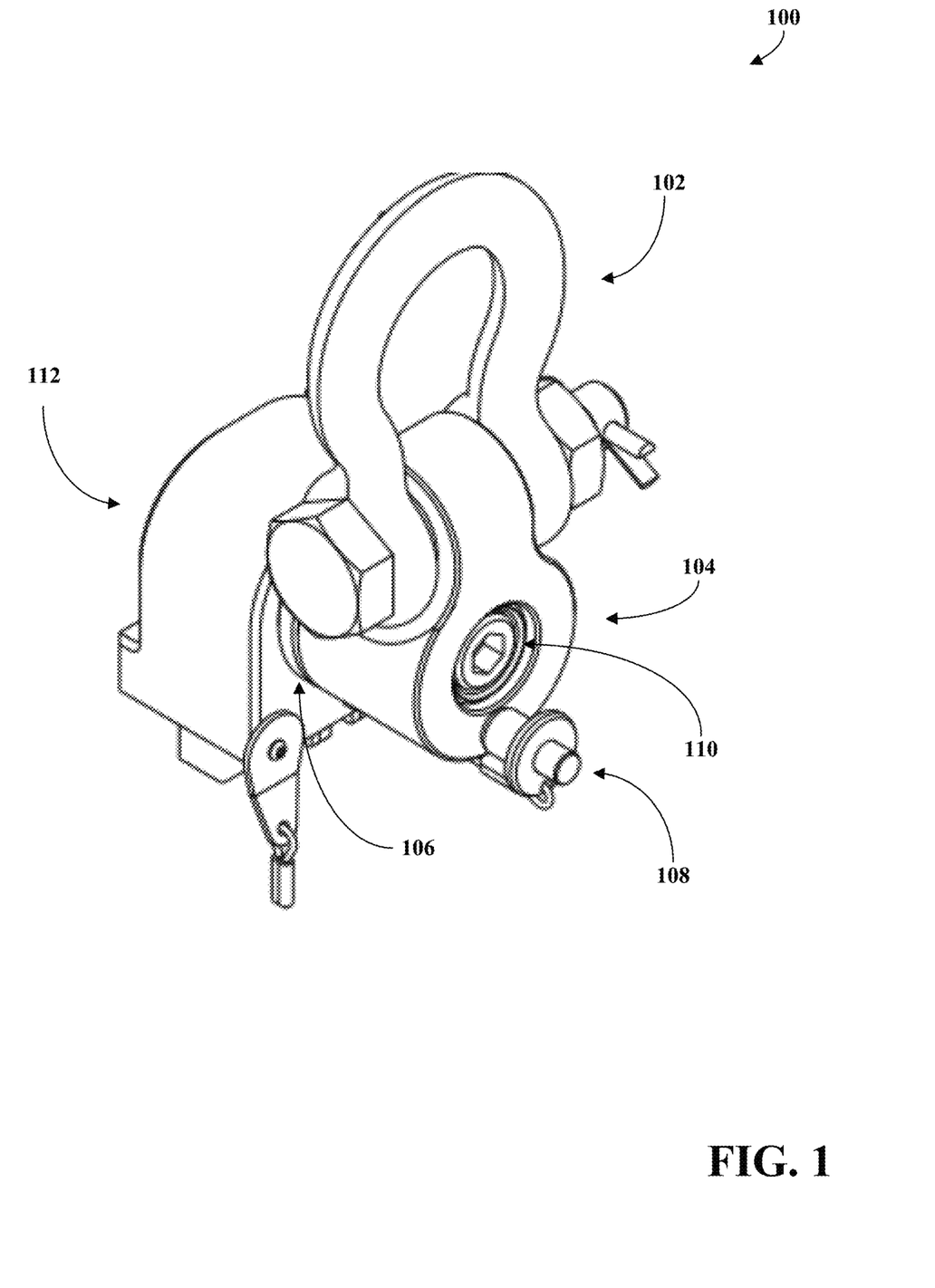
FIG. 1 illustrates an exemplary locking side pull hoist ring assembly.

Turning to FIG. 1, illustrated is one embodiment of an apparatus for rotating a workpiece and selectively locking the workpiece at different orientations. The apparatus can be attached to any part of the workpiece and can take any suitable shape for attaching to that part. In the illustrated embodiment, the apparatus comprises a locking side pull hoist ring assembly 100 that attaches to a side surface of a workpiece 112, a portion of which is illustrated in FIG. 1.

The locking side pull hoist ring assembly 100 includes a load bearing structure 102 for suspending the locking side pull hoist ring assembly 100 and the workpiece 112, a rotation mechanism 106 for rotating the workpiece 112 with respect to the locking side pull hoist ring assembly 100, a support member 104 for connecting the rotation mechanism 106 and the load bearing structure 102, a locking mechanism 108 for locking the workpiece 112 at particular orientations, and a bolt 110 for attaching the locking side pull hoist ring assembly 100 to the workpiece 112. The support member 104 may be configured to retain a portion of the load bearing structure 102, the rotation mechanism 106, the locking mechanism 108, and/or the bolt 110, as will be described below.

Figure 2:
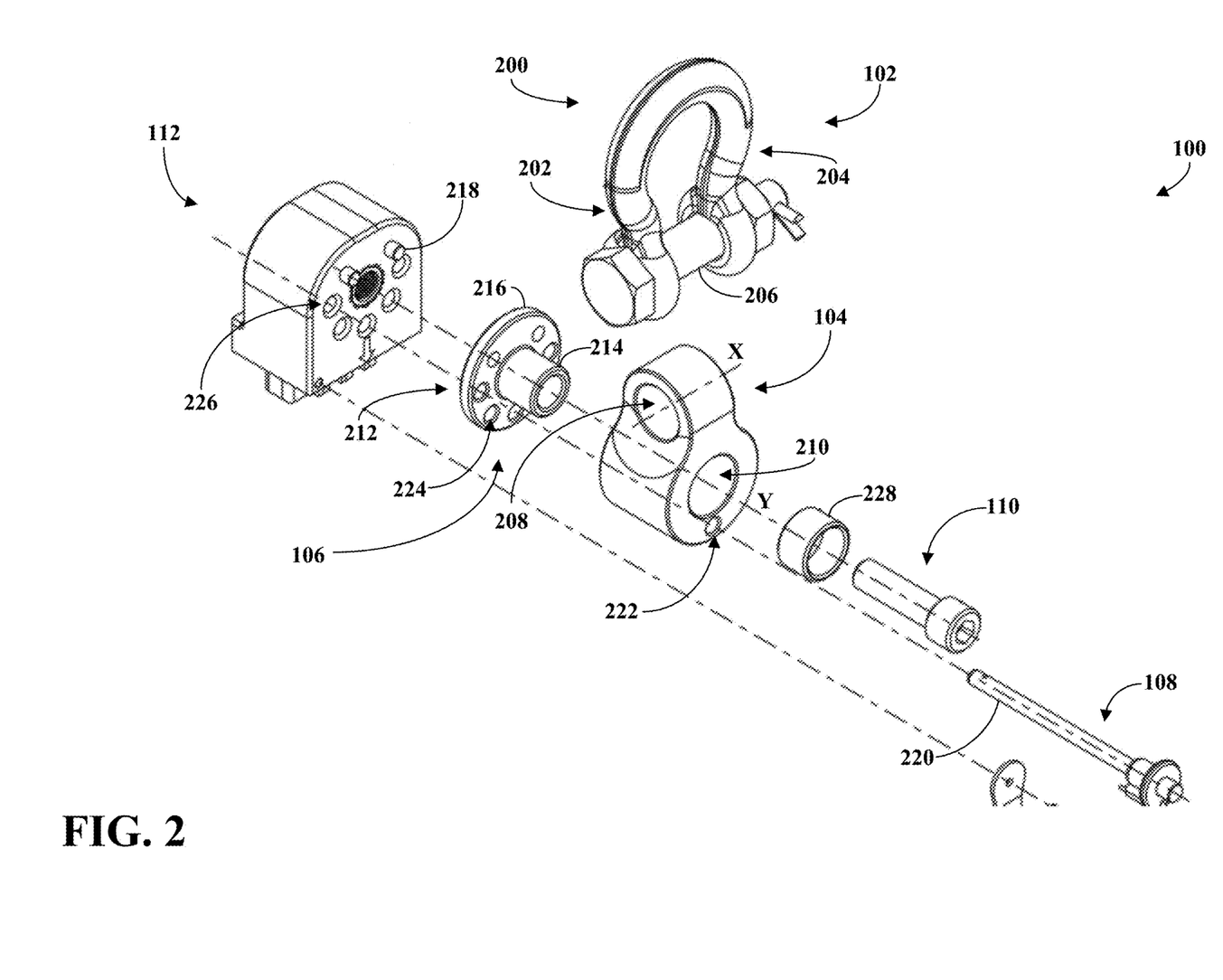
FIG. 2 illustrates an exploded view of the exemplary locking side pull hoist ring assembly.

Turning now to FIG. 2, illustrated is an exploded view of the locking side pull hoist ring assembly 100 illustrated in FIG. 1. The load bearing structure 102 may take any suitable shape for holding a workpiece 112 in suspension below a crane. For instance, the load bearing structure 102 may hang on a sling suspended from a crane. FIG. 2 illustrates an embodiment of a load bearing structure 102 that comprises a shackle 200. The shackle 200 can take any suitable shape for being suspending from the crane via a hook, sling, and/or the like. In the illustrated embodiment, the shackle 200 is generally U-shaped with two legs 202 and 204. The legs 202 and 204 can include axially aligned openings to receive a pivot pin 206 to attach the shackle 200 to the support member 104. In another embodiment, the load bearing structure comprises a sling, chain, rope, a hook, or the like that is directly connected to the support member 104.

The support member 104 can take any suitable shape and/or size for receiving the pivot pin 206 to attach the shackle 200 to the support member 104. For instance, in the illustrated embodiment, the support member 104 includes a passage 208 having a cross-section shaped and sized to receive the pivot pin 206. The pivot pin passage 208 can be shaped to permit the pivot pin 206 to rotate about an axis X defined by the pivot pin passage 208 and/or can hold the pivot pin 206 at a specific position and orientation. In the illustrated embodiment, the pivot pin passage 208 has a circular cross-section with a diameter adapted to pivotally receive the pivot pin 206.

The support member 104 further includes a second passage 210 for receiving the rotation mechanism 106. Similar to the pivot pin passage 208, the rotation mechanism passage 210 may take any suitable shape and/or size for rotatably receiving the rotation mechanism 106 and may depend on the rotation mechanism 106, the locking mechanism 108, and/or the like. The rotation mechanism passage 210 can be shaped to define a rotation axis Y for the rotation mechanism 106 in the locking side pull hoist ring assembly 100. In order to secure the support member 104 to the workpiece 112, the rotation mechanism passage 210 may be further shaped and sized to permit the bolt 110 to pass therethrough. As will be described further in detail below, the rotation mechanism 106 may be shaped to permit the bolt 110 to pass therethrough such that rotation mechanism 106 is sandwiched between the support member 104 and the workpiece 112 when the support member 104 is secured to the workpiece 112.

The pivot pin passage 208 and the rotation mechanism passage 210 can be arranged in any suitable layout in the support member 104 to permit rotation of the pivot pin 206 and the rotation mechanism 106 as described above. In the illustrated embodiment, the pivot pin passage 208 and the rotation mechanism passage 210 are arranged perpendicular to each other such that rotation axis X of the pivot pin 206 is perpendicular to the rotation axis Y of the rotation mechanism 106.

The rotation mechanism 106 can take any suitable shape and/or size for permitting rotation of the workpiece 112 with respect to the locking side pull hoist ring assembly 100. In the embodiment illustrated in FIG. 2, the rotation mechanism 106 comprises a flange bushing 212 with a cylindrical bushing 214 and a rim 216 positioned at an end of the bushing 214. The bushing 214 can be inserted into the support member 104 to be rotatably held therein and the flange bushing 212 can be removably attached to the workpiece 112 such that as the workpiece 112 rotates the flange bushing 212 also rotates. In the illustrated embodiment, the bushing 214 has a cylindrical cross-section, however the bushing 214 can have any suitable cross-section (e.g., rectangular, triangular, ovular, etc.). Similarly, the illustrated rim 216 has a circular cross-section but can have any cross-section. The bushing 214 and the rim 216 can have similar shaped cross-sections (e.g., circular) or they can vary. As noted above, an interior diameter of the bushing 214 is sized to accommodate the bolt 110 to permit the bolt to pass therethrough to attach to the workpiece 112.

The rotation mechanism 106 may further include structure in order to secure the rotation mechanism 106 to the workpiece 112 so that as the workpiece 112 rotates the flange bushing 212 similarly rotates in the axis Y defined by the rotation mechanism passage 210 of the support member 104. In the illustrated embodiment, the workpiece 112 includes two pins 218 and the rim 216 includes corresponding indents or apertures to receive the pins 218. By securing the workpiece 112 and the flange bushing 212 together, preventing rotation of the flange bushing 212 via the locking mechanism 108 can additionally prevent rotation of the workpiece 112.

The locking mechanism 108 is configured to permit a user to selectively unlock the locking side pull hoist ring assembly 100 to rotate the workpiece 112 to a desired orientation and then to lock the workpiece 112 at the desired orientation, thereby preventing further rotation of the workpiece 112. In order to lock the workpiece 112 at the desired orientation, the locking mechanism 108 can be configured to lock the rotation mechanism 106 to the support member 104 to prevent rotation of the rotation mechanism 106 in the axis Y defined by the rotation mechanism passage 210. The locking mechanism 108 can take any suitable shape and/or structure for locking the workpiece 112 at the desired orientation.

For instance, in the illustrated embodiment, the locking mechanism 108 comprises a pin 220 that extends through a third passage 222 in the support member 104 to engage the flange bushing 212 and prevent rotation of the flange bushing 212 relative to the support member 104 and by extension prevent rotation of the workpiece 112 relative to the support member 104. By passing through the third passage 222, the pin 220 can engage the support member 104 and the flange bushing 212 to prevent rotation of the flange bushing 212 relative to the support member 104. The pin 220 can engage the flange bushing 212 in any suitable manner to prevent rotation of the flange bushing 212 relative to the support member 104.

For example, in the illustrated embodiment, the flange bushing 212 includes a plurality of apertures 224 arranged about the rim 216 and that extend through the rim 216. The apertures 224 can be used to secure the flange bushing 212 (and by extension the workpiece 112) at particular orientations relative to the support member 104. More specifically, the flange bushing 212 can be secured at a first orientation by inserting the pin 220 into a first aperture, the pin 220 can be removed from the first aperture, the flange bushing 212 can be rotated to a second orientation associated with a second aperture in the rim 216, and can be secured at the second orientation by inserting the pin 220 into the second aperture. The apertures 224 can be arranged in any suitable pattern on the rim 216. In the illustrated embodiment, the apertures 224 are arranged in a circle and are spaced 45 degrees apart from one another.

In addition to engaging the aperture 224 in the flange bushing 212, the pin 220 may extend into the workpiece 112 to further engage the workpiece 112. More particularly, the pin 220 can extend through the aperture 224 into an indent 226 in the workpiece 112. The workpiece 112 can include any suitable number of indents 226 and may include a number of indents 226 that correspond to the number of apertures 224 in the flange bushing 212 and may be arranged in a pattern similar to the pattern of the apertures 224 in the flange bushing 212. Pins 218 on the workpiece 112 can also be aligned with the apertures that extend through the rim 216 to provide additional structure that prevents rotation of the workpiece 112 relative to the rotation member 106 and further relative to the support member 104.

In the illustrated embodiment, the pin 220 is free standing and may be removed from the support member 104 as desired (e.g., to allow for rotation of the workpiece 112 about the axis Y defined by the passage 210). In another embodiment, instead of the user manually pushing the pin 220 into the desired aperture, the pin 220 may be secured to the support member 104 via a spring that pushes the pin 220 into the desired aperture. A user can unlock the flange bushing 212 to permit rotation of the flange bushing 212 relative to the support member 104 by pulling the pin 220 away from the flange bushing 212 and compressing the spring. The flange bushing 212 can then be relocked by letting go of the pin 220; the spring will cause the pin 220 to automatically reengage the flange bushing 212 to lock the flange bushing 212 to the support member 104. For example, where the flange bushing 212 includes apertures arranged thereon (as illustrated in FIG. 2), the user can unlock the flange bushing 212 for rotation by pulling the pin 220 out of a first aperture and releasing the pin 220 to automatically engage a second aperture. Because of the spring attached to the pin 220, the pin 220 can be released as the flange bushing 212 is rotated and the pin 220 will automatically engage the next aperture.

In another example, the pin 220 can press on a surface of the rim 216 of the flange bushing 212 that faces the support member 104 to prevent rotation of the flange bushing 212 relative to the support member 104. Because the flange bushing 212 is sandwiched between the workpiece 112 and the support member 104, pressing an end of the pin 220 onto the surface of the rim 216 can generate a frictional force that prevents the flange bushing 212 from rotating relative to the support member 104. In this example, the pin 220 may comprise a flat point screw so that the screw can be tightened against the surface of the rim 216 to increase the frictional force therebetween. In this embodiment, the surface of the rim 216 of the flange bushing 212 engaged by the screw may be planar or may include indents to better prevent sliding of the screw along the surface of the rim 216.

In another exemplary embodiment, the locking mechanism 108 comprises a spring that is attached to the flange bushing 212 at one end and the support member 104 at an opposing end to draw the flange bushing 212 and the support member 104 towards each other. The flange bushing 212 can be unlocked by pulling the support member 104 away from the flange bushing 212 to permit relative rotation between the flange bushing 212 and the support member 104 and then relocked by releasing the support member 104, thus causing the spring to draw the flange bushing 212 and the support member 104 back together. Additionally, the flange bushing 212 and/or the support member 104 may include interlocking structures that engage when the spring pulls the flange bushing 212 and support member 104 together to further prevent relative rotation when they are joined. The interlocking structures may be similar to gears. In addition to and/or in lieu of the spring between the flange bushing 212 and the support member 104, a compression spring can be placed inside the rotation mechanism passage 210 to create a compressive force on the bushing 214 to prevent rotation of the flange bushing 212.

In yet another example, the locking mechanism 108 may comprise one or more buttons on a surface of the support member 104, wherein the buttons permit rotation of the flange bushing 212 relative to the support member 104 when such buttons are depressed. In such an embodiment, the button may function similarly to a tumbler lock, in that when the button is not depressed, a spring in a shaft drives a pin down onto a surface preventing the pin from aligning with the shear line of the lock. Depressing the button cause the pin to align with the shear line to permit rotation.

In a yet further embodiment, the locking mechanism 108 may be or include hydraulics and/or pneumatics. In another example, the locking mechanism 108 may be magnetic in nature. In yet another example, the locking mechanism 108 can include electro-mechanical structures.

Any of the above described locking mechanisms may be employed in the locking side pull hoist ring assembly 100 individually and/or in combination. The locking mechanism selected may depend on a weight of the workpiece 112. For example, where the weight is above a certain threshold, the locking mechanism 108 comprising the pin 220 that extends through the aperture 224 of the flange bushing 212 may be selected.

The locking side pull hoist ring assembly 100 may further include a cylinder 228 configured to sit between the bushing 214 of the flange bushing 212 and the exterior of the rotation mechanism passage 210. The cylinder 228 can be used to space the bushing 214 from the interior of the rotation mechanism passage 210 to reduce friction between the bushing 214 and the rotation mechanism passage 210 as the bushing 214 rotates within the rotation mechanism passage 210.

Figure 3:
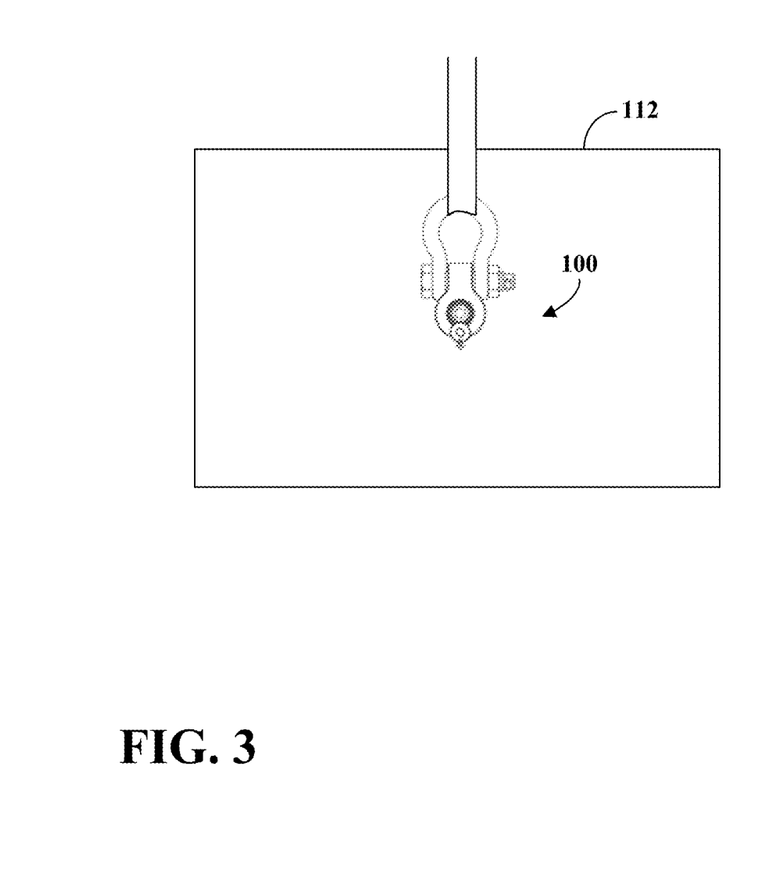
FIG. 3 illustrates an exemplary locking side pull hoist ring assembly holding a workpiece at a first orientation.
Figure 4:
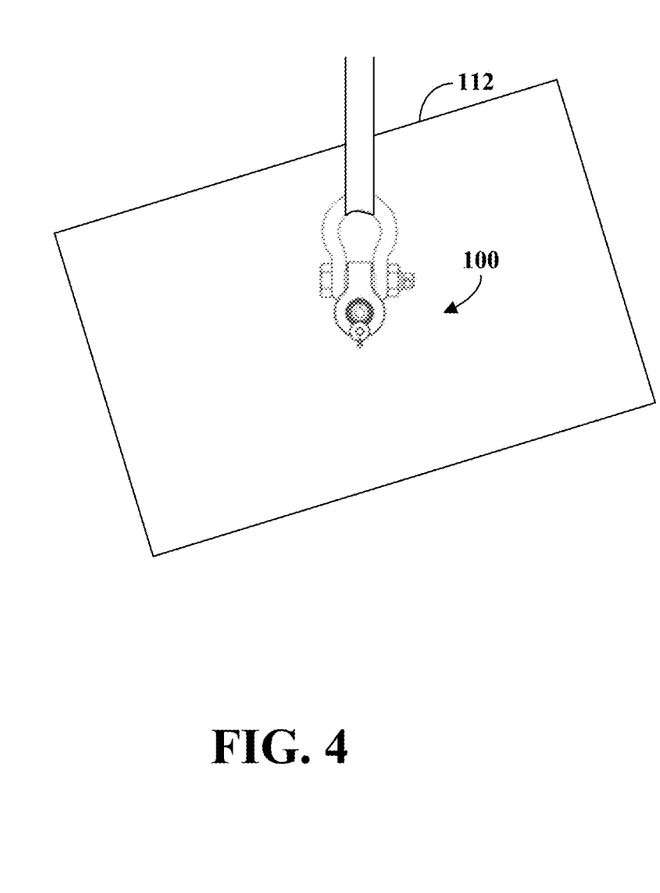
FIG. 4 illustrates a further exemplary locking side pull hoist ring assembly holding a workpiece at a second orientation.

Turning now to FIGS. 3 and 4, illustrated is a workpiece 112 attached to the locking side pull hoist ring assembly 100 and locked at two different orientations. The workpiece 112 can be rotated to each of these three orientations and then secured at each of these orientations via the locking side pull hoist ring assembly 100. For instance, the workpiece 112 can be secured at the first orientation illustrated in FIG. 3 via the locking mechanism 108. The locking mechanism 108 can then be unlocked and the workpiece 112 can be rotated to the second orientation illustrated in FIG. 4 and then locked, via the locking mechanism 108, at this second orientation.

Figure 5:
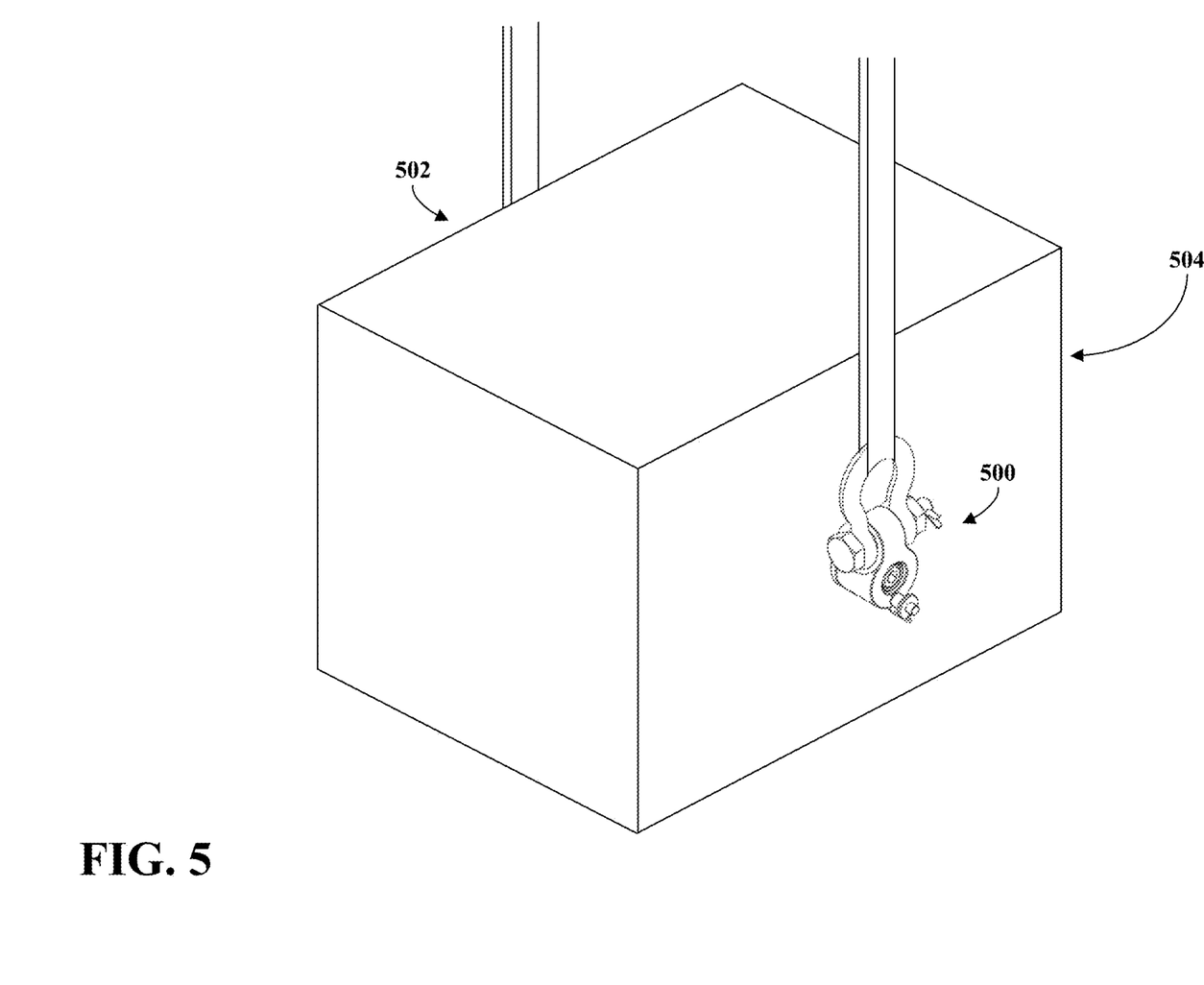
FIG. 5 illustrates two exemplary locking side pull hoist ring assemblies secured on sides of a workpiece.

Because the locking side pull hoist ring assembly 100 may be attached to the side of the workpiece 112, a second locking side pull hoist ring assembly may be attached to a second side of the workpiece opposite the locking side pull hoist ring assembly 100. Illustrated in FIG. 5 is an embodiment where a first locking side pull hoist ring assembly 500 is attached to a first side of a workpiece 504 and a second locking side pull hoist ring assembly 502 is attached to a second side of the workpiece 504. In order to control rotating the workpiece 504, a rotation axis of the rotation mechanism of the first locking side pull hoist ring assembly 500 and a rotation axis of the rotation mechanism of the second locking side pull hoist ring assembly 502 can be aligned on the opposing sides of the workpiece 504. In order for better control of rotation of the workpiece 504, in addition to being aligned, the rotation axis of the rotation mechanism of the first locking side pull hoist ring assembly 500 and the rotation axis of the rotation mechanism of the second locking side pull hoist ring assembly 502 can be aligned with a center of gravity of the workpiece 504. Moreover, by aligning with the center of gravity of the workpiece 504, the stress on the locking mechanism of each locking side pull hoist ring assembly 500 and 502 can be reduced.

Each part of the locking side pull hoist ring assembly can be made of any suitable material. For instance, the rotation mechanism, the support member, and/or the bushing can be made of steel, stainless steel, and/or the like. In addition, one or more parts of the locking side pull hoist ring can include a coating to help with corrosion resistance.

Figure 6:
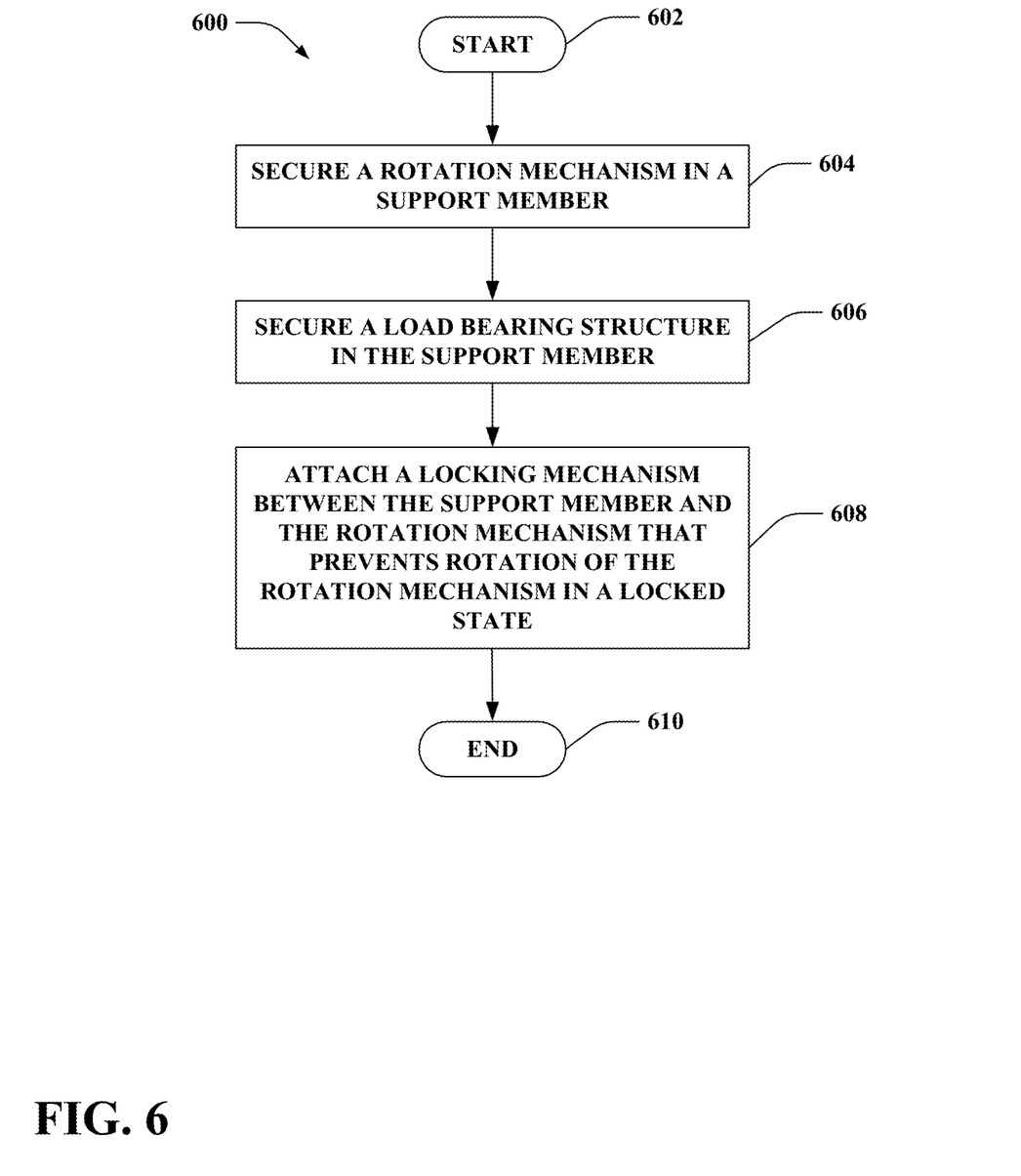
FIG. 6 is a flow diagram that illustrates an exemplary methodology for forming a rotatable locking side pull hoist ring.

FIG. 6 illustrates an exemplary methodology relating to forming a rotatable locking side pull hoist ring. While the methodology is shown as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Referring now to FIG. 6, an exemplary methodology 600 for forming a rotatable locking side pull hoist ring is illustrated. The methodology 600 starts at 602, and at 604, a rotation mechanism is secured to a support member. The support member can rotatably support the rotation mechanism for rotation about a rotation axis. At 606, a load bearing shackle is secured in the support member. The support member can rotatably support the load bearing shackle for rotation about a second axis. The second axis and the rotation axis may be different. At 608, a locking mechanism is attached between the support member and the rotation mechanism. The locking mechanism can be configured to transition between a locked state and an unlocked state. In the locked states, the locking mechanism prevents rotation of the rotation mechanism. The methodology 600 concludes at 610.

In an embodiment of the methodology 600, the step of attaching the locking mechanism between the support member and the rotation mechanism comprises passing a pin through a hole in the support member to hold the rotation mechanism in a particular orientation. In a version of this embodiment of the methodology 600, the step of attaching the locking mechanism further comprises passing the pin through a corresponding aperture in the rotation mechanism to secure the support member and the rotation mechanism at the particular orientation. In a version of this version of the embodiment of the methodology 600, the pin is attached to a spring force that removably retains the pin in at least one of the hole in the support member or the aperture of the rotation mechanism.

In another embodiment of the methodology 600, the step of attaching the locking mechanism between the support member and the rotation mechanism comprises attaching a tension spring to the rotation mechanism and the support member.

In yet another embodiment of the methodology 600, the rotation mechanism comprises a flange bushing. The step of securing the rotation mechanism in the support member comprises inserting a neck of the flange bushing into the support member. In a version of the embodiment of the methodology 600, a rim of the flange bushing includes a plurality of apertures each configured to receive the locking mechanism.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. An assembly for rotating a workpiece comprising:
  a locking side pull hoist ring removably attachable to a side surface of the workpiece comprising:
    a rotation mechanism attached to the side surface of the workpiece, wherein the rotation mechanism rotates about a rotation axis extending through the rotation mechanism;
    a locking mechanism configured to transition between a locked state and an unlocked state, wherein in the locked state the locking mechanism prevents rotation of the rotation mechanism, wherein in the unlocked state the rotation mechanism is rotatable about the rotation axis; and
    a support member connecting a load bearing structure and the rotation mechanism, wherein the support member rotatably supports the rotation mechanism for rotation about the rotation axis, wherein the support member rotatably supports the load bearing structure for rotation about a second axis, wherein the rotation mechanism rotates with respect to the support member, wherein the locking mechanism in the locked state secures the rotation mechanism to the support member at a particular orientation, and further wherein the locking mechanism in the locked state further secures the workpiece at the particular orientation with respect to the support member.

2. The assembly of claim 1, wherein the rotation mechanism comprises a flange bushing attached to workpiece, wherein a neck of the flange bushing extends into the support member.

3. The assembly of claim 2, wherein the flange bushing includes a plurality of apertures arranged around a rim of the flange bushing, wherein the support member includes a hole, wherein the locking mechanism comprises a pin that extends through the hole in the support member and an aperture from the plurality of apertures in the rim of the flange bushing to secure the flange bushing to the support member in the locked state.

4. The assembly of claim 3, wherein the flange bushing is bolted to the side of the workpiece, wherein the plurality of apertures in the rim of the flange bushing align with a corresponding plurality of apertures in the workpiece, wherein pin further extends into an aperture from the plurality of apertures in the workpiece in the locked state.

5. The assembly of claim 3, wherein the pin is attached to a spring force that removably retains the pin in at least one of the hole in the support member or the aperture from the plurality of apertures in the flange bushing.

6. The assembly of claim 2, wherein the support member includes a hole, wherein the locking mechanism comprises a flat point screw that passes through the hole and engages with a rim of the flange bushing to secure the flange bushing to the support member at the particular orientation in the locked state.

7. The assembly of claim 6, wherein the rim of the flange bushing includes an indentation configured to engage the flat point screw.

8. The assembly of claim 1, wherein the locking mechanism comprises a tension spring attached to the rotation mechanism and to the support member that pulls the rotation mechanism and the support member towards each other in the locked state.

9. The assembly of claim 1, wherein the locking mechanism comprises a button on an exterior of the locking side pull hoist ring, wherein depression of the button permits rotation of the rotation mechanism.

10. The assembly of claim 1, further comprising:
a second locking side pull hoist ring removably attachable to a second side surface of the workpiece, wherein the second side surface is opposite the side surface, wherein the second locking side pull hoist ring comprises a rotation mechanism attached to the second side surface of the workpiece, wherein the rotation mechanism rotates about a rotation axis extending through the rotation mechanism, wherein the rotation axis of the locking side pull hoist ring and the rotation axis of the second locking side pull hoist ring are aligned about the workpiece to generate an assembly axis.

11. The assembly of claim 10, wherein the locking side pull hoist ring and the second locking side pull hoist ring are arranged about the workpiece such that the assembly axis aligns with a center of gravity of the workpiece.

12. The assembly of claim 1, wherein the second axis is perpendicular to the rotation axis.

13. A method of forming a rotatable locking side pull hoist ring comprising:
securing a rotation mechanism in a support member, wherein the support member rotatably supports the rotation mechanism for rotation about a rotation axis;
securing a load bearing structure in the support member, wherein the support member rotatably supports the load bearing structure for rotation about a second axis, wherein the second axis and the rotation axis are different; and
attaching a locking mechanism between the support member and the rotation mechanism, wherein the locking mechanism is configured to transition between a locked state and an unlocked state, wherein in the locked state the locking mechanism prevents rotation of the rotation mechanism, wherein the locking mechanism in the locked state secures the rotation mechanism to the support member at a particular orientation, and further wherein the locking mechanism in the locked state further secures the workpiece at the particular orientation with respect to the support member.

14. The method of claim 13, wherein attaching the locking mechanism between the support member and the rotation mechanism comprises passing a pin through a hole in the support member to hold the rotation mechanism in a particular orientation.

15. The method of claim 14, wherein attaching the locking mechanism further comprises passing the pin through a corresponding aperture in the rotation mechanism to secure the support member and the rotation mechanism at the particular orientation.

16. The method of claim 15, wherein the pin is attached to a spring force that removably retains the pin in at least one of the hole in the support member or the aperture of the rotation mechanism.

17. The method of claim 13, wherein attaching the locking mechanism between the support member and the rotation mechanism comprises attaching a tension spring to the rotation mechanism and the support member.

18. The method of claim 13, wherein the rotation mechanism comprises a flange bushing, wherein securing the rotation mechanism in the support member comprises inserting a neck of the flange bushing into the support member.

19. The method of claim 18, wherein a rim of the flange bushing includes a plurality of apertures each configured to receive the locking mechanism.

20. An apparatus for releasably holding a workpiece at different orientations comprising:
means for attaching to a surface of the workpiece;
means for rotating the workpiece about an axis defined by the apparatus; and
means for selectively locking the workpiece at different orientations preventing further rotation of the workpiece with respect to the apparatus.

* * * * *